US008088933B2

(12) United States Patent
Qin et al.

(10) Patent No.: US 8,088,933 B2
(45) Date of Patent: Jan. 3, 2012

(54) CHARGE CONTROL AGENT AND TONER COMPRISING THE SAME

(75) Inventors: Xiaorong Qin, Wuhan (CN); Lin Wu, Wuhan (CN); Zeguan Lan, Wuhan (CN)

(73) Assignee: Hubei Dinglong Chemical Co., Ltd., Wuhan (CN)

( * ) Notice: Subject to any disclaimer, the term of this patent is extended or adjusted under 35 U.S.C. 154(b) by 999 days.

(21) Appl. No.: 11/971,951

(22) Filed: Jan. 10, 2008

(65) Prior Publication Data

US 2008/0261137 A1 Oct. 23, 2008

(30) Foreign Application Priority Data

Apr. 19, 2007 (CN) .......................... 2007 1 0051914

(51) Int. Cl.
*C07F 5/06* (2006.01)
*G03G 9/00* (2006.01)

(52) U.S. Cl. ...... 549/212; 549/206; 549/210; 430/108.3

(58) Field of Classification Search .................. 549/206, 549/210, 212; 430/108.3
See application file for complete search history.

(56) References Cited

PUBLICATIONS

Shi-li Sun et al., Mol. Nutr. Food Res., vol. 52, pp. 465-471 (2008).*

* cited by examiner

*Primary Examiner* — Porfirio Nazario Gonzalez
(74) *Attorney, Agent, or Firm* — Matthias Scholl P.C.; Matthias Scholl

(57) ABSTRACT

Discussed herein are a charge control agent and toner comprising said charge control agent. Said toner of the invention is comprised of a resin, a colorant, and the charge control agent, wherein, said charge control agent is comprised of a specific type of metal complexes. In the invention, the charge control agent has excellent charge control properties and the characteristics of uniform crystalline size, high charge speed, high thermo stability, low moisture absorption, and good compatibility with resin. The toner of the invention has excellent electrical characteristics and produces stable image of high quality under a wide range of environmental conditions without dusting and fogging.

2 Claims, 8 Drawing Sheets

Table 1

| Embodiment | Toner number | Charge control Agent number | Charge amount (−μC / g) | | | | | | Charge stability (−μC / g) | |
|---|---|---|---|---|---|---|---|---|---|---|
| | | | 1 minute | 2 minute | 5 minute | 10 minute | 20 minute | 60 minute | Initial charge amount | Charge amount after storage |
| Embodiment 1 | 1 | 1 | 22.1 | 23.6 | 23.8 | 23.9 | 23.8 | 23.8 | 24.3 | 23.9 |
| Embodiment 2 | 2 | 2 | 21.4 | 21.9 | 22.0 | 22.1 | 22.6 | 22.5 | 22.9 | 22.4 |
| Embodiment 3 | 3 | 3 | 22.5 | 22.7 | 22.8 | 22.9 | 22.9 | 22.9 | 23.5 | 22.9 |
| Embodiment 4 | 4 | 4 | 22.7 | 23.6 | 23.7 | 23.5 | 23.5 | 23.5 | 24.1 | 23.8 |
| Embodiment 5 | 5 | 5 | 23.0 | 23.9 | 23.8 | 23.8 | 23.8 | 23.7 | 24.3 | 23.1 |
| Embodiment 6 | 6 | 6 | 23.1 | 24.0 | 24.3 | 24.3 | 24.3 | 24.2 | 24.0 | 22.6 |
| Embodiment 7 | 7 | 7 | 21.9 | 22.8 | 22.7 | 22.7 | 22.6 | 22.6 | 23.6 | 22.9 |
| Embodiment 8 | 8 | 8 | 21.8 | 22.4 | 22.7 | 22.8 | 22.8 | 22.7 | 22.8 | 21.7 |
| Embodiment 9 | 9 | 9 | 21.9 | 22.5 | 22.6 | 22.7 | 22.7 | 22.6 | 23.7 | 22.7 |
| Comp. 1 | Comp. 1 | E−81 | 21.7 | 25.8 | 29.1 | 30.3 | 32.6 | 29.8 | 30.3 | 17.5 |
| Comp. 2 | Comp. 2 | S−34 | 19.4 | 23.5 | 26.7 | 28.5 | 26.3 | 25.4 | 28.5 | 15.4 |
| Comp. 3 | Comp. 3 | E−88 | 12.3 | 14.3 | 15.4 | 16.0 | 16.4 | 16.0 | 16.0 | 14.3 |

Fig. 1

Table 2

| Embodiment | 20℃ / 50% RH | | | | | | | | 35℃ / 85% RH | | | | | | | |
|---|---|---|---|---|---|---|---|---|---|---|---|---|---|---|---|---|
| | Initial stage | | | | 500,000 | | | | Initial stage | | | | 500,000 | | | |
| | Image density | Fog | Resolution | Charge amount | Image density | Fog | Resolution | Charge amount | Image density | Fog | Resolution | Charge amount | Image density | Fog | Resolution | Charge amount |
| 1 | 1.41 | 0.001 | 7.0 | 24.3 | 1.42 | 0.001 | 6.0 | 21.3 | 1.42 | 0.001 | 7.0 | 22.0 | 1.43 | 0.001 | 7.0 | 21.0 |
| 2 | 1.41 | 0.001 | 7.0 | 22.8 | 1.42 | 0.002 | 6.0 | 20.2 | 1.42 | 0.001 | 7.0 | 21.3 | 1.42 | 0.001 | 7.0 | 21.0 |
| 3 | 1.41 | 0.001 | 7.0 | 22.7 | 1.42 | 0.001 | 6.0 | 21.4 | 1.42 | 0.001 | 7.0 | 21.0 | 1.42 | 0.001 | 7.0 | 21.0 |
| 4 | 1.41 | 0.001 | 7.0 | 23.4 | 1.42 | 0.001 | 6.0 | 21.9 | 1.42 | 0.001 | 7.0 | 21.3 | 1.42 | 0.001 | 7.0 | 20.6 |
| 5 | 1.42 | 0.001 | 7.0 | 23.4 | 1.43 | 0.002 | 6.0 | 21.5 | 1.42 | 0.001 | 7.0 | 21.3 | 1.43 | 0.001 | 7.0 | 21.0 |
| 6 | 1.41 | 0.001 | 7.0 | 23.2 | 1.42 | 0.002 | 6.0 | 21.5 | 1.42 | 0.001 | 7.0 | 22.4 | 1.42 | 0.001 | 7.0 | 21.2 |
| 7 | 1.41 | 0.001 | 7.0 | 22.1 | 1.42 | 0.001 | 6.0 | 21.1 | 1.42 | 0.001 | 7.0 | 22.3 | 1.42 | 0.001 | 7.0 | 20.8 |
| 8 | 1.41 | 0.001 | 7.0 | 22.9 | 1.42 | 0.001 | 6.0 | 21.3 | 1.42 | 0.001 | 7.0 | 22.1 | 1.42 | 0.001 | 7.0 | 20.6 |
| 9 | 1.42 | 0.001 | 7.0 | 22.8 | 1.42 | 0.001 | 6.0 | 21.0 | 1.42 | 0.001 | 7.0 | 22.0 | 1.42 | 0.001 | 7.0 | 20.1 |
| Comp. 1 | 1.35 | 0.001 | 7.0 | 30.3 | 1.42 | 0.012 | 4.0 | 25.3 | 1.42 | 0.001 | 7.0 | 29.3 | 1.32 | 0.014 | 4.0 | 15.6 |
| Comp. 2 | 1.37 | 0.001 | 7.0 | 28.5 | 1.43 | 0.011 | 4.0 | 20.1 | 1.42 | 0.001 | 7.0 | 27.4 | 1.31 | 0.013 | 4.0 | 14.6 |
| Comp. 3 | 1.44 | 0.002 | 7.0 | 16.0 | 1.45 | 0.013 | 3.0 | 13.2 | 1.42 | 0.002 | 7.0 | 14.9 | 1.31 | 0.014 | 3.0 | 10.3 |

Fig. 2

Table 3

| Embodiment | Toner number | Charge control agent number | Charge amount（—μC / g） | | | | | | Charge stability（—μC / g） | |
|---|---|---|---|---|---|---|---|---|---|---|
| | | | 1 minute | 2 minute | 5 minute | 10 minute | 20 minute | 60 minute | Initial charge amount | Charge amount after storage |
| Embodiment 10 | 10 | 1 | 22.4 | 23.5 | 23.7 | 23.8 | 23.9 | 23.8 | 23.8 | 22.9 |
| Embodiment 11 | 11 | 2 | 22.0 | 23.0 | 23.2 | 23.4 | 23.6 | 23.5 | 23.4 | 21.8 |
| Embodiment 12 | 12 | 3 | 22.2 | 23.5 | 23.7 | 23.8 | 23.9 | 23.8 | 23.4 | 21.6 |
| Embodiment 13 | 13 | 4 | 22.3 | 23.6 | 23.9 | 24.0 | 24.3 | 24.3 | 22.9 | 21.8 |
| Embodiment 14 | 14 | 5 | 23.0 | 23.9 | 24.1 | 24.3 | 24.5 | 24.7 | 24.3 | 22.5 |
| Embodiment 15 | 15 | 6 | 23.4 | 24.9 | 25.6 | 25.7 | 25.8 | 25.5 | 24.3 | 22.6 |
| Embodiment 16 | 16 | 7 | 21.7 | 22.7 | 23.1 | 23.4 | 23.4 | 23.3 | 23.6 | 21.9 |
| Embodiment 17 | 17 | 8 | 22.0 | 23.1 | 23.4 | 23.6 | 23.7 | 23.7 | 22.7 | 21.0 |
| Embodiment 18 | 18 | 9 | 22.0 | 24.1 | 24.5 | 24.7 | 24.7 | 24.6 | 24.5 | 23.0 |
| Comp. 4 | Comp. 4 | E-81 | 19.4 | 22.6 | 24.6 | 26.8 | 29.1 | 30.3 | 26.8 | 18.3 |
| Comp. 5 | Comp. 5 | S-34 | 14.6 | 19.0 | 21.3 | 23.6 | 27.4 | 28.1 | 23.6 | 16.5 |
| Comp. 6 | Comp. 6 | E-88 | 10.2 | 12.4 | 15.4 | 16.9 | 17.3 | 17.8 | 16.4 | 12.1 |

Fig. 3

Table 4

| Embodiment | 20℃ / 50% RH | | | | | | | | 35℃ / 85% RH | | | | | | | |
|---|---|---|---|---|---|---|---|---|---|---|---|---|---|---|---|---|
| | Initial stage | | | | 500,00 | | | | Initial stage | | | | 500,000 | | | |
| | Image density | Fog | Resolution | Charge amount | Image density | Fog | Resolution | Charge amount | Image density | Fog | Resolution | Charge amount | Image density | Fog | Resolution | Charge amount |
| 10 | 1.41 | 0.001 | 8.0 | 23.6 | 1.42 | 0.001 | 7.0 | 22.1 | 1.42 | 0.001 | 8.0 | 22.9 | 1.42 | 0.001 | 8.0 | 22.6 |
| 11 | 1.41 | 0.001 | 8.0 | 23.4 | 1.42 | 0.001 | 7.0 | 22.0 | 1.42 | 0.001 | 8.0 | 22.9 | 1.42 | 0.001 | 8.0 | 22.6 |
| 12 | 1.41 | 0.001 | 8.0 | 23.6 | 1.42 | 0.001 | 7.0 | 21.6 | 1.42 | 0.001 | 8.0 | 22.3 | 1.42 | 0.001 | 8.0 | 22.0 |
| 13 | 1.42 | 0.001 | 8.0 | 24.1 | 1.42 | 0.001 | 7.0 | 22.9 | 1.42 | 0.001 | 8.0 | 22.8 | 1.42 | 0.001 | 8.0 | 21.9 |
| 14 | 1.41 | 0.001 | 8.0 | 24.1 | 1.42 | 0.001 | 7.0 | 22.8 | 1.43 | 0.001 | 8.0 | 22.5 | 1.43 | 0.001 | 8.0 | 22.0 |
| 15 | 1.41 | 0.001 | 8.0 | 25.0 | 1.42 | 0.001 | 7.0 | 23.8 | 1.42 | 0.001 | 8.0 | 22.6 | 1.42 | 0.001 | 8.0 | 21.4 |
| 16 | 1.41 | 0.001 | 8.0 | 23.1 | 1.42 | 0.001 | 7.0 | 21.9 | 1.42 | 0.001 | 8.0 | 22.4 | 1.42 | 0.001 | 8.0 | 21.4 |
| 17 | 1.41 | 0.001 | 8.0 | 23.6 | 1.42 | 0.001 | 7.0 | 21.4 | 1.43 | 0.001 | 8.0 | 21.0 | 1.43 | 0.001 | 8.0 | 21.3 |
| 18 | 1.41 | 0.001 | 8.0 | 24.7 | 1.42 | 0.001 | 7.0 | 21.9 | 1.42 | 0.001 | 8.0 | 21.7 | 1.42 | 0.001 | 8.0 | 21.0 |
| Comp. 4 | 1.41 | 0.001 | 8.0 | 26.8 | 1.41 | 0.012 | 4.0 | 23.0 | 1.42 | 0.001 | 8.0 | 24.5 | 1.34 | 0.012 | 4.0 | 13.2 |
| Comp. 5 | 1.41 | 0.001 | 8.0 | 23.6 | 1.41 | 0.011 | 4.0 | 19.2 | 1.42 | 0.001 | 8.0 | 20.5 | 1.32 | 0.012 | 4.0 | 11.3 |
| Comp. 6 | 1.41 | 0.001 | 8.0 | 16.4 | 1.45 | 0.012 | 3.0 | 13.2 | 1.42 | 0.001 | 8.0 | 15.2 | 1.13 | 0.014 | 3.0 | 10.9 |

Fig. 4

Table 5

| Embodiment | Toner number | Charge control agent number | Charge amount (−μC / g) | | | | | | Charge stability (−μC / g) | |
|---|---|---|---|---|---|---|---|---|---|---|
| | | | 1 minute | 2 minute | 5 minute | 10 minute | 20 minute | 60 minute | Initial stage charge amount | Charge amount after storage |
| Embodiment 19 | 19 | 1 | 23.5 | 24.5 | 24.6 | 24.7 | 24.7 | 24.7 | 24.6 | 24.0 |
| Embodiment 20 | 20 | 2 | 23.0 | 24.1 | 24.2 | 24.2 | 24.3 | 24.2 | 24.2 | 23.8 |
| Embodiment 21 | 21 | 3 | 23.1 | 24.5 | 24.6 | 24.6 | 24.6 | 24.5 | 24.5 | 24.0 |
| Embodiment 22 | 22 | 4 | 23.1 | 24.0 | 24.1 | 24.1 | 24.2 | 24.1 | 24.3 | 23.9 |
| Embodiment 23 | 23 | 5 | 24.6 | 25.4 | 25.3 | 25.5 | 25.5 | 25.4 | 25.4 | 24.3 |
| Embodiment 24 | 24 | 6 | 24.1 | 25.4 | 25.4 | 25.4 | 25.4 | 25.3 | 25.3 | 24.8 |
| Embodiment 25 | 25 | 7 | 23.0 | 23.7 | 24.0 | 24.1 | 24.0 | 24.0 | 24.0 | 23.5 |
| Embodiment 26 | 26 | 8 | 22.9 | 25.0 | 25.1 | 25.2 | 25.2 | 25.2 | 25.3 | 24.6 |
| Embodiment 27 | 27 | 9 | 23.0 | 24.5 | 24.6 | 24.5 | 24.5 | 24.5 | 24.7 | 23.9 |
| Comp. 7 | Comp. 7 | E-81 | 20.1 | 24.7 | 30.1 | 32.4 | 33.9 | 35.1 | 32.4 | 23.4 |
| Comp. 8 | Comp. 8 | S-34 | 17.6 | 23.5 | 26.8 | 29.0 | 30.3 | 26.5 | 29.0 | 21.0 |
| Comp. 9 | Comp. 9 | E-88 | 10.1 | 15.8 | 19.0 | 24.8 | 27.8 | 30.5 | 24.8 | 15.6 |

Fig. 5

Table 6

| Embodimen | 20℃ / 50% RH | | | | | | | | 35℃ / 85% RH | | | | | | | |
|---|---|---|---|---|---|---|---|---|---|---|---|---|---|---|---|---|
| | Initial stage | | | | 500,000 | | | | Initial stage | | | | 500,000 | | | |
| | Image density | Fog | Resolution | Charge amount | Image density | Fog | Resolution | Charge amount | Image density | Fog | Resolution | Charge amount | Image density | Fog | Resolution | Charge amount |
| 19 | 1.41 | 0.001 | 8.0 | 24.6 | 1.42 | 0.001 | 7.0 | 24.1 | 1.42 | 0.001 | 8.0 | 23.1 | 1.42 | 0.001 | 8.0 | 22.0 |
| 20 | 1.41 | 0.001 | 8.0 | 24.3 | 1.42 | 0.001 | 7.0 | 23.5 | 1.42 | 0.001 | 8.0 | 22.7 | 1.42 | 0.001 | 8.0 | 21.4 |
| 21 | 1.41 | 0.001 | 8.0 | 24.5 | 1.42 | 0.001 | 7.0 | 23.8 | 1.42 | 0.001 | 8.0 | 22.9 | 1.42 | 0.001 | 8.0 | 21.1 |
| 22 | 1.41 | 0.001 | 8.0 | 24.2 | 1.42 | 0.001 | 7.0 | 23.5 | 1.42 | 0.001 | 8.0 | 23.6 | 1.42 | 0.001 | 8.0 | 21.3 |
| 23 | 1.42 | 0.001 | 8.0 | 25.5 | 1.42 | 0.001 | 7.0 | 24.3 | 1.42 | 0.001 | 8.0 | 23.1 | 1.42 | 0.001 | 8.0 | 21.0 |
| 24 | 1.41 | 0.001 | 8.0 | 25.4 | 1.42 | 0.001 | 7.0 | 24.6 | 1.42 | 0.001 | 8.0 | 24.6 | 1.42 | 0.001 | 8.0 | 22.3 |
| 25 | 1.41 | 0.001 | 8.0 | 24.1 | 1.42 | 0.001 | 7.0 | 23.5 | 1.42 | 0.001 | 8.0 | 22.6 | 1.42 | 0.001 | 8.0 | 20.0 |
| 26 | 1.41 | 0.001 | 8.0 | 25.2 | 1.41 | 0.001 | 7.0 | 24.5 | 1.43 | 0.001 | 8.0 | 23.5 | 1.43 | 0.001 | 8.0 | 21.1 |
| 27 | 1.41 | 0.001 | 8.0 | 24.3 | 1.42 | 0.001 | 7.0 | 23.3 | 1.42 | 0.001 | 8.0 | 23.2 | 1.42 | 0.001 | 8.0 | 20.9 |
| Comp. 7 | 1.41 | 0.001 | 8.0 | 32.4 | 1.42 | 0.001 | 7.0 | 23.5 | 1.42 | 0.001 | 8.0 | 29.1 | 1.32 | 0.011 | 4.0 | 29.2 |
| Comp. 8 | 1.41 | 0.001 | 8.0 | 29.0 | 1.42 | 0.001 | 7.0 | 22.3 | 1.42 | 0.001 | 8.0 | 26.7 | 1.31 | 0.012 | 4.0 | 17.2 |
| Comp. 9 | 1.41 | 0.001 | 8.0 | 24.8 | 1.42 | 0.001 | 7.0 | 16.3 | 1.42 | 0.001 | 8.0 | 21.4 | 1.14 | 0.016 | 3.0 | 10.2 |

Fig. 6

Table 7

| Embodiment | Toner number | Charge control agent number | Charge amount (−μC / g) | | | | | | Charge stability (−μC / g) | |
|---|---|---|---|---|---|---|---|---|---|---|
| | | | 1 minute | 2 minute | 5 minute | 10 minute | 20 minute | 60 minute | Initial stage charge amount | Charge amount after storage |
| Embodiment 28 | 28 | 1 | 20.0 | 21.9 | 22.4 | 22.3 | 22.3 | 22.3 | 22.3 | 21.2 |
| Embodiment 29 | 29 | 2 | 20.0 | 21.9 | 22.2 | 22.4 | 22.5 | 22.4 | 22.3 | 21.4 |
| Embodiment 30 | 30 | 3 | 21.0 | 21.7 | 22.0 | 22.1 | 22.1 | 22.2 | 22.1 | 20.0 |
| Embodiment 31 | 31 | 4 | 20.9 | 22.3 | 24.0 | 24.5 | 24.3 | 24.3 | 23.1 | 20.5 |
| Embodiment 32 | 32 | 5 | 22.5 | 23.7 | 23.5 | 23.5 | 23.4 | 23.4 | 22.3 | 20.1 |
| Embodiment 33 | 33 | 6 | 21.5 | 22.5 | 22.4 | 22.5 | 22.5 | 22.3 | 20.9 | 19.2 |
| Embodiment 34 | 34 | 7 | 21.0 | 22.3 | 22.3 | 22.4 | 22.3 | 22.3 | 21.0 | 19.6 |
| Embodiment 35 | 35 | 8 | 21.1 | 23.0 | 23.1 | 23.1 | 23.0 | 23.0 | 21.2 | 19.9 |
| Embodiment 36 | 36 | 9 | 21.0 | 22.0 | 22.4 | 22.5 | 22.5 | 22.5 | 20.9 | 19.0 |
| Comp. 10 | Comp. 10 | E-81 | 15.3 | 22.5 | 27.5 | 30.3 | 33.6 | 29.1 | 30.3 | 19.5 |
| Comp. 11 | Comp. 11 | S-34 | 13.6 | 21.5 | 26.5 | 27.7 | 27.6 | 25.3 | 27.7 | 16.6 |
| Comp. 12 | Comp. 12 | E-88 | 10.0 | 15.4 | 17.3 | 19.3 | 21.6 | 23.1 | 19.3 | 12.1 |

Fig. 7

Table 8

| Embodiment | 20℃ / 50% R H | | | | | | | | 35℃ / 85% R H | | | | | | | |
|---|---|---|---|---|---|---|---|---|---|---|---|---|---|---|---|---|
| | Initial stage | | | | 500,000 | | | | Initial stage | | | | 500,000 | | | |
| | Image density | Fog | Resolution | Charge amount | Image density | Fog | Resolution | Charge amount | Image density | Fog | Resolution | Charge amount | Image density | Fog | Resolution | Charge amount |
| 28 | 1.42 | 0.001 | 8.0 | 21.0 | 1.42 | 0.001 | 7.0 | 21.0 | 1.42 | 0.001 | 8.0 | 23.2 | 1.42 | 0.001 | 8.0 | 22.0 |
| 29 | 1.41 | 0.001 | 8.0 | 21.0 | 1.42 | 0.001 | 7.0 | 21.0 | 1.42 | 0.001 | 8.0 | 23.1 | 1.42 | 0.001 | 8.0 | 22.1 |
| 30 | 1.42 | 0.001 | 8.0 | 21.4 | 1.42 | 0001 | 7.0 | 21.2 | 1.42 | 0.001 | 8.0 | 23.3 | 1.42 | 0.001 | 8.0 | 21.1 |
| 31 | 1.41 | 0.001 | 8.0 | 21.1 | 1.42 | 0.001 | 7.0 | 21.0 | 1.42 | 0.001 | 8.0 | 23.1 | 1.42 | 0.001 | 8.0 | 21.0 |
| 32 | 1.41 | 0.001 | 8.0 | 21.0 | 1.42 | 0.001 | 7.0 | 21.0 | 1.42 | 0.001 | 8.0 | 23.1 | 1.42 | 0.001 | 8.0 | 21.0 |
| 33 | 1.41 | 0.001 | 8.0 | 21.3 | 1.42 | 0.001 | 7.0 | 21.3 | 1.42 | 0.001 | 8.0 | 23.1 | 1.42 | 0.001 | 8.0 | 21.2 |
| 34 | 1.41 | 0.001 | 8.0 | 21.0 | 1.42 | 0.001 | 7.0 | 21.2 | 1.43 | 0.001 | 8.0 | 23.0 | 1.43 | 0.001 | 8.0 | 21.2 |
| 35 | 1.42 | 0.001 | 8.0 | 21.0 | 1.42 | 0.001 | 7.0 | 21.3 | 1.42 | 0.001 | 8.0 | 23.2 | 1.42 | 0.001 | 8.0 | 21.3 |
| 36 | 1.41 | 0.001 | 8.0 | 21.0 | 1.42 | 0.001 | 7.0 | 21.2 | 1.42 | 0.001 | 8.0 | 23.1 | 1.42 | 0.001 | 8.0 | 21.3 |
| Comp. 10 | 1.41 | 0.001 | 8.0 | 30.3 | 1.37 | 0.011 | 4.0 | 30.3 | 1.42 | 0.001 | 8.0 | 23.1 | 1.31 | 0.015 | 3.0 | 16.5 |
| Comp. 11 | 1.41 | 0.001 | 8.0 | 27.7 | 1.28 | 0.012 | 4.0 | 27.7 | 1.42 | 0.001 | 8.0 | 24.1 | 1.00 | 0.017 | 3.0 | 12.3 |
| Comp. 12 | 1.41 | 0.001 | 8.0 | 19.3 | 1.19 | 0.016 | 4.0 | 19.3 | 1.42 | 0.001 | 8.0 | 16.2 | 1.32 | 0.019 | 2.0 | 10.0 |

Fig. 8

CHARGE CONTROL AGENT AND TONER COMPRISING THE SAME

CROSS-REFERENCE TO RELATED APPLICATIONS

This application claims priority to Chinese Patent Application No. 200710051914.0 filed on Apr. 19, 2007, the contents of which are incorporated herein by reference.

BACKGROUND OF THE INVENTION

1. Field of the Invention

The invention is related to a charge control agent and the toner containing such charge control agent.

2. Description of the Related Art

Charge control agent, mainly constituted by metal complexes, have been extensively used in various areas, i.e., in the toner used in forming developer for developing an image in electrophotographic technology, in which the charge control agent is used as a component material of such toners (e.g., please refer to patent documents: Public Notice 63-61347, Public Notice 2-16916, Public Notice 2002-53539, Public Notice 2531957, Public Notice 7-97530, Public Notice 2005-121776).

The metal complexes normally used as the charge control agent in toners include generally known azo-metal complexes and salicylate-metal complexes.

One side, in an image-forming process by an image-forming apparatus using electrophotographic technology, it is necessary to heat the toner image recorded on a transfer material to fix the image. In recent years, low-temperature image fixing has been used to save energy.

However, in the chemical structure of azo-metal complexes and salicylate-metal complexes, the metal ion often tends to detach from the structure. As a result, in the toners using an azo-metal complexes or a salicylate-metal complexes as the charge control agent, the detached metal ion may bridge with the resin structure, which is another ingredient of the toners. This will cause the softening-point temperature of the toners to increase. Thus, high-quality image in low-temperature fixing cannot be obtained. In addition, the image quality will be greatly affected by humidity variations in the fixing environment. These are existing problems.

Thus, metal-free chemicals, such as calixarene compounds, are used as a charge control agent for toners. Comparing with the toners using metal-complexes as charge control agent, the charge characteristics of the toners using metal-free chemicals as charge control agent are inadequate, and the charges on the toner particles are not uniform. As a result, dusting and fogging of the toner occurs because the toners particles are not sufficiently charged.

SUMMARY OF THE INVENTION

Based on the above-mentioned facts and the advanced research conducted by the inventors, it is found that the key problems of traditional charge control agent are non-homogeneous crystal sizes, high moisture absorption, poor dispersion in resin, and high probability that the metal ion will detach from the chemical structure. In view of the above-described problems, it is one objective of the invention to provide a charge control agent with excellent charge control properties.

Another objective of the invention is to provide a toner that is capable of obtaining high-quality, stable image under a wide range of environmental conditions.

A charge control agent comprising a specific type of gallate metal complexes represented by Chemical Formula (1) or Chemical Formula (2) is provided:

(1)

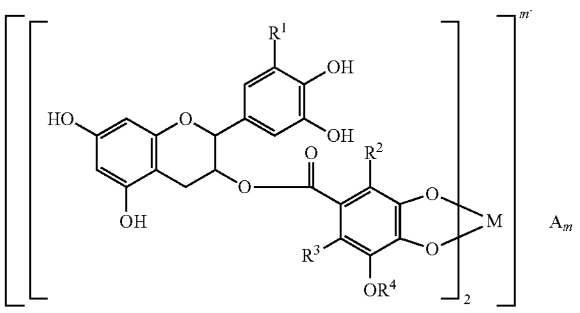

[In formula (1), $R^1$ represents a hydroxyl ion or a hydrogen atom; $R^2$ and $R^3$ independently represent an alkyl group with 1-12 carbon atoms, an alkenyl group with 2-12 carbon atoms, an alkoxy group with 1-12 carbon atoms, an aryl group with 6-12 carbon atoms, a nitryl group, an amidogen group, a halogen atom, or a hydrogen atom; $R^4$ represents a hydrogen atom, a potassium atom, or a sodium atom; M represents a metal atom that may range from divalent to tetravalent; A is a cation; and m is an integer from 1 to 6.]

(2)

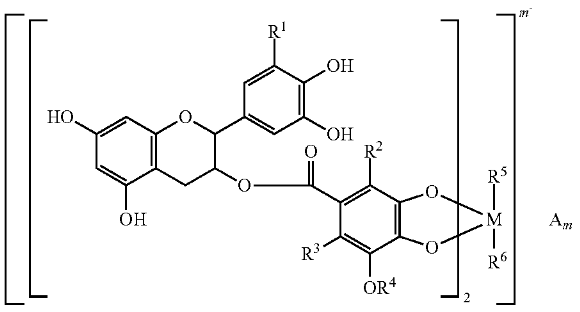

[In formula (2), $R^1$ represents a hydroxyl ion or a hydrogen atom; $R^2$ and $R^3$ independently represent an alkyl group with 1-12 carbon atoms, an alkenyl group with 2-12 carbon atoms, an alkoxy group with 1-12 carbon atoms, an aryl group with 6-12 carbon atoms, a nitryl group, an amidogen group, a halogen atom, or a hydrogen atom; $R^4$ represents a hydrogen atom, a potassium atom, or a sodium atom; $R^5$ and $R^6$ independently represent a hydroxide group, a water molecule, or a halogen atom; M represents a metal atom that may range from divalent to tetravalent; A is a cation; and m is an integer from 1 to 6.]

The toner of the invention is comprised of a resin, a colorant, and the charge control agent, wherein, the charge control agent is comprised of a metal complexes represented by the chemical formula (1) or chemical formula (2).

In the invention, the catechin gallate metallic complexes that constitutes the charge control agent has the characteristics of uniform crystal size, high charge speed, high thermo stability, low moisture absorption, and good compatibility with the resin.

Hereafter is a detailed description of the invention.

The charge control agent of the invention is constituted by the chemical compounds shown in the above Chemical Formula (1) (hereafter referred to as 'specific catechin gallate metallic complexes (1)') or the above Chemical Formula (2) (hereafter referred to as 'specific catechin gallate metallic complexes (2)').

If the charge control agent of the invention is constituted by specific catechin gallate metallic complexes (1) or specific catechin gallate metallic complexes (2), chemical formula (1) (hereafter referred to as 'specific catechin gallate metallic complexes (1)') or chemical formula (2) (hereafter referred to as 'specific catechin gallate metallic complexes (2)') can be constituted by the catechin gallate metallic complexes with different plurality of A.

In the chemical formula (1) representing the specific catechin gallate metallic complexes (1), $R^1$ is a hydrogen atom or hydroxyl ion. If $R^1$ is a hydrogen atom, specific catechin gallate metallic complexes (1) represents the compound that has the original ligand in the catechin gallate derivative; if $R^1$ is a hydroxyl ion, specific catechin gallate metallic complexes (1) represents the compound that has the original ligand in the epigallocatechin gallate derivative.

In chemical formula (1), $R^2$ and $R^3$ independently represent an alkyl group with 1-12 carbon atoms, an alkenyl group with 2-12 carbon atoms, an alkoxy group with 1-12 carbon atoms, an aryl group with 6-12 carbon atoms, a nitryl group, an amidogen group, a halogen atom, or a hydrogen atom; $R^2$ and $R^3$ can be the same or they can be different groups.

The alkyl group represented by $R^2$ and $R^3$ can be, for example, a methyl group, an ethyl group, a propyl group, a butyl group, an octyl group, a 2-ethylhexyl group, a decyl group, or a dodecyl group.

An alkenyl group represented by $R^2$ and $R^3$ can be, for example, a 2-propylene group, a 2-octylene group, a 2-decylene group, or a 2-laurylene group.

An alkoxy group represented by $R^2$ and $R^3$ can be, for example, a methoxy($CH_3O$—) group, an ethoxy($C_2H_5O$—) group, a propoxy ($C_3H_7O$—) group, a butoxy ($C_4H_9O$—) group, a phenoxy ($C_6H_{13}O$—) group, an octoxy ($C_8H_{17}O$—) group, a decyloxy ($C_{10}H_{21}O$—) group, or a dodecy ($C_{12}H_{25}O$—) group.

An aryl group represented by $R^2$ and $R^3$ can be, for example, a phenyl group, a 4-toluene group, a 4-tert-butylbenzene group, a 2,6-dimethylbenzene group, or a 2,4,6-trimethylbenzene group.

An halogen atom group represented by $R^2$ and $R^3$ can be, for example, a chlorine atom, a bromine atom, or an iodine atom.

In addition, in chemical formula (1), $R^4$ can be a potassium atom, a sodium atom, or a hydrogen atom.

In addition, in chemical formula (1), M can be a metal atom that ranges from divalent to tetravalent.

The metal atom M can be, for example, a zinc atom (Zn), a cobalt atom (Co), a nickel atom (Ni), an aluminum atom (Al), a chromium atom (Cr), an iron atom (Fe), a zirconium atom (Zr), or a copper atom (Cu).

In addition, in chemical formula (1), A is a counterion.

The counterion represented by A can be, for example, a hydrogen atom ($H^+$), an ammonium ion ($NH_4^+$), a sodium ion ($Na^+$), or a potassium ion ($K^+$).

Preferred embodiments of specific catechin gallate metal complexes (1) include the following compounds.

(1-1) In the compound of chemical formula (1), $R^1$ is a hydroxyl group, $R^2$, $R^3$, and $R^4$ are hydrogen atoms, M is a zinc atom, A is a sodium ion, and m is 1.

(1-2) In the compound of chemical formula (1), $R^1$, $R^2$, $R^3$, and $R^4$ are hydrogen atoms, M is a zinc atom, A is a sodium ion, and m is 1.

(1-3) In the compound of chemical formula (1), $R^1$ is a hydroxyl group, $R^2$, $R^3$, and $R^4$ are hydrogen atoms, M is a chromium atom, A is a ammonium ion, and m is 1.

(1-4) In the compound of chemical formula (1), $R^1$ is a hydroxyl group, $R^2$, $R^3$, and $R^4$ are hydrogen atoms, M is a iron atom, A is a sodium ion, and m is 1.

(1-5) In the compound of chemical formula (1), $R^1$, $R^2$, $R^3$, and $R^4$ are hydrogen atoms, M is a chromium atom, A is a ammonium ion, and m is 1.

(1-6) In the compound of chemical formula (1), $R^1$ is a hydroxyl group, $R^2$ and $R^3$ are methyl groups, $R^4$ is a hydrogen atom, M is a zinc atom, A is a sodium ion, and m is 1.

(1-7) In the compound of chemical formula (1), $R^1$ is a hydroxyl group, $R^2$ and $R^3$ are octyl groups, $R^4$ is a hydrogen atom, M is a zinc atom, A is a sodium ion, and m is 1.

(1-8) In the compound of chemical formula (1), $R^1$ is a hydroxyl group, $R^2$ and $R^3$ are dodecyl groups, $R^4$ is a hydrogen atom, M is a zinc atom, A is a sodium ion, and m is 1.

(1-9) In the compound of chemical formula (1), $R^1$ is a hydroxyl group, $R^2$, $R^3$, and $R^4$ are hydrogen atoms, M is a zinc atom, A is a kalium ion, and m is 1.

(1-10) In the compound of chemical formula (1), $R^1$ is a hydroxyl group, $R^2$, $R^3$, and $R^4$ are hydrogen atoms, M is a zirconium atom, A is a sodium ion, and m is 1.

(1-11) In the compound of chemical formula (1), $R^1$ is a hydroxyl group, $R^2$, $R^3$, and $R^4$ are hydrogen atoms, M is an aluminium atom, A is a sodium ion, and m is 1.

(1-12) In the compound of chemical formula (1), $R^1$ is a hydroxyl group, $R^2$ is a phenyl group, $R^3$ and $R^4$ are hydrogen atoms, M is a zinc atom, A is a sodium ion, and m is 1.

(1-13) In the compound of chemical formula (1), $R^1$ is a hydroxyl group, $R^2$ and $R^3$ are chlorine atoms, $R^4$ is a hydrogen atom, M is a zinc atom, A is a sodium ion, and m is 1.

(1-14) In the compound of chemical formula (1), $R^1$ is a hydroxyl group, $R^2$ and $R^3$ are methyl groups, $R^4$ is a hydrogen atom, M is an iron atom, A is a sodium ion, and m is 1.

(1-15) In the compound of chemical formula (1), $R^1$ is a hydroxyl group, $R^2$ and $R^3$ are methyl groups, $R^4$ is a hydrogen atom, M is an aluminium atom, A is a kalium ion, and m is 1.

In chemical formula (2) representing the specific catechin gallate metallic complexes (2), $R^1$ is a hydrogen atom or hydroxyl group. If $R^1$ is a hydrogen atom, the specific catechin gallate metallic complexes (2) represents the compound with the original ligand in the epicatechin gallate derivative; If $R^1$ is a hydroxyl group, the specific catechin gallate metallic complexes (2) represents the compound with the original ligand in the epigallocatechin gallate derivative.

In chemical formula (2), $R^2$ and $R^3$ independently represent an alkyl group with 1-12 carbon atoms, an alkenyl group with 2-12 carbon atoms, an alkoxy group with 1-12 carbon atoms, an aryl group with 6-12 carbon atoms, a nitryl group, an amidogen group, a halogen atom, or a hydrogen atom; $R^2$ and $R^3$ can be the same or they can be different groups.

The alkyl group, alkenyl group, alkoxy group, aryl group, and halogen atom representing $R^2$ and $R^3$ can independently be the example group in chemical formula (1) representing the specific catechin gallate metallic complexes (1).

In addition, in chemical formula (2), $R^4$ represents a hydrogen atom, a zinc atom, or a kalium atom.

In addition, in chemical formula (2), $R^5$ and $R^6$ independently represent a hydroxyl group, a water molecule, or a halogen atom. $R^9$ and $R^{10}$ can be the same groups or different groups.

In addition, the halogen atom representing $R^5$ and $R^6$ can be, for example, a chlorine atom, a bromine atom, or an iodine atom.

In addition, in chemical formula (2), M is a metal atom that can range from divalent to tetravalent.

The metal atom represented by M can be the same groups as those in chemical formula (1) of the specific catechin gallate metal complexes (1).

In addition, in chemical formula (2), A is a cation.

The cation represented by A can be the same example groups in chemical formula (1) of the specific catechin gallate metallic complexes (1).

The preferred embodiments of the specific catechin gallate metallic complexes (2) are:

(2-1) In the compound of chemical formula (2), $R^1$ is a hydroxyl group, $R^2$, $R^3$, and $R^4$ are hydrogen atoms, $R^5$ and $R^6$ are water molecules, M is a cobalt atom, A is a sodium ion, and m is 1.

(2-2) In the compound of the chemical formula (2), $R^1$, $R^2$, $R^3$, and $R^4$ are hydrogen atoms, $R^5$ and $R^6$ are water molecules, M is a cobalt atom, A is a sodium ion, and m is 1.

The charge control agent constituted by the specific catechin gallate metallic complexes (1) and the specific catechin gallate metallic complexes (2) can be prepared by the following process.

For embodiment, the catechin gallate compounds shown in chemical formula (3) (hereafter referred to as 'raw catechin gallate compound') is dissolved in water or alcohols to prepare a raw catechin gallate compound solution and the metal ion solution containing the metal ion that will be used in the metal coordination reaction.

Then, the metal ion solution and the raw catechin gallate compound solution is mixed with a molar ratio ranging from 1:3 to 1:2. During the initial stage of the mixing process, the mixture should be weakly acidic, i.e., the pH value should be slightly less than 7; then the pH value is adjusted so that the solution is weakly basic (pH slightly greater than 7), and the solution is stirred for 6-48 hours at a temperature in the range of 30° C.-90° C., so that the metal ion is coordinated to form the metal complexes. The compound of chemical formula (1) can be obtained:

(3)

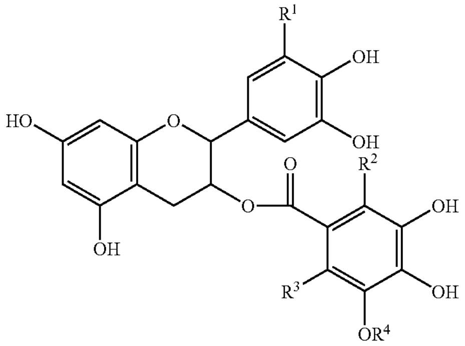

[In formula (3), $R^1$ represents a hydroxyl group or an hydrogen atom; $R^2$ and $R^3$ independently represent an alkyl group with 1-12 carbon atoms, an alkenyl group with 2-12 carbon atoms, an alkoxy group with 1-12 carbon atoms, an aryl group with 6-12 carbon atoms, a nitryl, an amidogen, a halogen atom, or a hydrogen atom; $R^4$ represents a hydrogen atom, a potassium atom or a sodium atom.]

During the preparation of the complexes, the choices of raw catechin gallate compounds and metal ion solution are based on the required type of resultant catechin gallate metal complexes.

For embodiment, the metal ion solution can be, for example, a zinc chloride solution, a chrome vitriol solution, or a zinc vitriol solution.

The preferred solvent used to prepare solutions of raw catechin gallate compounds can be, for example, water, methanol, ethanol, n-propanol, isopropanol, glycerine, acetone, or acetic acid.

The mixed solution of raw catechin gallate compounds solution and metal ion solution should be acidic (pH less than 7) at the initial stage. The pH value at the initial stage should be above 3, and it is preferred that the value be above 3.5. If the solution is more acidic than the above value (i.e., the pH value is less than 3), the solubility of the phenol hydroxyl group in the raw catechin gallic will be reduced, and the reaction will be inhibited.

At this stage of adjusting the pH value, the solvent used to obtain the metal ion solution can be, for example, hydrochloric acid or sulfuric acid.

The next stage of the initial mixing is a stage in which raw catechin gallate compound solution and metal ion solution are mixed and the complexation reaction begins. It is necessary to ionize the phenol hydroxyl group. So, the pH value of the solution is below 11, and the preferred pH value is below 10. With the weak basic condition, the ionization of the phenol hydroxyl group can occur, and therefore the formation of the complexes can be improved.

During this complex formation stage, the pH value adjustment can be achieved by adding, for example, sodium hydroxide, potassium hydroxide, calcium hydroxide, or ammonia to the mixture.

In addition, in the mixed solution of raw catechin gallate compound solution and metal ion solution, if the solvent is just alcohols, the pH value of the mixed solution cannot be adjusted; if an alkali metal alcoholate is used, e.g., sodium ethoxide or kalium ethoxide, the reaction can be controlled by adjusting the quantity.

Then, the resultant of the above mentioned complexes preparation is processed by after-treatments, such as washing and drying, and the charge control agent of such metal complexes can be obtained by the complexes preparation process.

The detergent remover in the lotion process can be, for example, water, methanol, ethanol, glycol, ethyl acetone, n-propanol, isopropanol, glycerine, acetone, or acetic acid.

The characteristics of the specific gallate metal complexes (1) and specific gallate metal complexes (2) that are the resultant charge control agent of the invention are: uniform crystal size, high charge speed and high thermo stability, low moisture absorption, and good compatibility with the resin. Thus, excellent charge control capability can be obtained.

In addition, the metal ion coordination in the specific catechin gallate complexes (1) and the specific catechin gallate complexes (2) is very strong, which minimizes the disengagement of metal ions in the metal complexes. Thus, in the cases in which such charge control agent are used in the toner, the disadvantages caused by the free metal ion impurity that is disengaged from the structure, such as metal bridging between free metal ion and resin that undermines the toner characteristics and results in high fluctuation of image quality in various environmental humidity conditions, can be minimized.

The above mentioned charge control agent of the invention can be used as an ingredient of toner as a developer for electrophotography, and it has very good performance.

In the toner of the invention, which adopts the charge control agent constituted by the above mentioned specific gallate metal complexes as a necessary ingredient, the resin and colorant should be contained except the charge control agent, and optional additives such as a release agent that is used to improve fusing property, and other external additives. These apply to both color and monochrome toners.

The components except the charge control agent of the toner in the invention are not limited. All suitable publicly-known materials can be adopted.

In embodiment, the resin can be a thermoplastic resin such as a styrene acrylic resin, a polyester resin, and an epoxy resin. These resins can be use separately or in combination.

The colorants can be a carbon black, a magnetic materials, a dye, and a pigment. Carbon black used can be, for example, a channel black, a furnace black, an acetylene black, a thermal black, and a gas black.

The magnetic materials can be a high-intensity magnetic materials such as an iron, a nickel, a cobalt, and compounds of these, such as alloy of these metals, ferrite, magnetite, and metal alloys that do not contain high intensity magnetic metal but have high magnetism after heat treatment, such as a Huesler alloy including manganese-copper-aluminum and manganese-copper-tin alloys and a chromium dioxide.

Dyes used in the toner can be C. I. solvent red 1, solvent red 49, solvent red 52, solvent red 58, solvent red 63, solvent red 111, solvent red 122; C.I. solvent yellow 19, solvent yellow 44, solvent yellow 77, solvent yellow 79, solvent yellow 81, solvent yellow 82, solvent yellow 93, solvent yellow 98, solvent yellow 103, solvent yellow 104, solvent yellow 112, solvent yellow 162; C.I. solvent blue 25, solvent blue 36, solvent blue 60, solvent blue 70, solvent blue 93, solvent blue 95, or combinations of these.

Pigments used in the toner can be C. I. pigment red 5, pigment red 48:1, pigment red 53:1, pigment red 57:1, pigment red 122, pigment red 139, pigment red 144, pigment red 149, pigment red 166, pigment 177, pigment red 178, pigment red 222, pigment red 239; C.I. pigment orange 31, pigment orange 43; C.I. pigment yellow 14, pigment yellow 27, pigment yellow 74, pigment yellow 93, pigment yellow 94, pigment yellow 138, pigment yellow 155, pigment yellow 180, pigment yellow 185; C.I. pigment green 7; C.I. pigment blue 15:3, pigment blue 60, or combinations of these.

The amount of these materials can be 2-10% of the total weight of the toner, and the preferred range is 3-8%.

Wax can be used in the toner in the invention; the preferred waxes are hydrocarbon wax, ester wax, natural wax, and amide wax.

Hydrocarbon wax includes low-molecular weight polyvinyl wax, low-molecular weight polypropylene wax, microcrystalline wax, Fischer-Tropsch wax and paraffin wax.

Ester wax includes ester of higher fatty acid and higher alcohols, e.g., behenyl behenate, behenyl stearate, stearoyl behenate, pentaerythritol stearate, and pentaerythritol behenate.

Natural wax includes, for example, carnauba wax, honey wax, and ice wax.

These waxes can be used separately or in a combinations of two or more of the above mentioned types.

The amount of the wax is 2-30% by total weight of the resin particle composition, the preferred amount is 3-25%, and the more preferred amount is 4-20%.

For the purpose of improving fluidity, cleaning properties, and transfer properties, various external additives can be used in the toner of the invention.

The external additives are not specially restricted. Usable embodiments include inorganic micro particles, organic micro particles, and lubricants.

Embodiments of inorganic micro particles include silicon dioxide, titanium dioxide, and aluminum oxide. Further, these particles are preferred subjected to hydrophobicity-imparting treatment by silane coupling agent or titanium coupling agent.

The preferred average particle size range for these inorganic particles from 5-300 nm. The particle size is determined under SEM ×50000 by determining the average Feret diameter of 500 particles.

The amount of external additives used in the toner can be 0.1-5.0% of total weight, preferably 0.5-4.0%. In addition, a combination of above-mentioned materials can be used as external additives.

In addition, metal salt of higher fatty acid may also be used, considering the transfer properties and cleaning properties, such as zinc stearate, lithium stearate, or calcium stearate. The preferable amount of such additives is 0.01-0.5% by weight.

If it is assumed that the total weight of the toner, except for the charge control agent, is 110 units, then the proportion of the charge control agent of the toner may be 0.1-3 units, preferably is 0.5-2.

If the toner contains an insufficient proportion of the charge control agent, the toner may not have sufficient electrical characteristics to function properly; in addition; if the toner contains an excessive proportion of the charge control agent, the toner may not have sufficient electric characteristics for the leakage of the charges of the charge control agent, and the component of the figure-forming device, such as the developing sleeve, will be polluted; especially if the toner is used as a composing material of the bicomponent developer, the polluted carrier will cause the toner not to have appropriate electrical characteristics.

The preparation methods of toner of the present invention quite flexible, and generally adopted methods such as the melting-kneading-pulverization method, suspension polymerization method, emulsion aggregation method, mini-emulsion aggregation method, polyester expansion method, and other publicly known methods can be used.

If the melting-kneading-pulverization method is selected as the method for preparing the charge control agent, the attraction between the charge control agent and the metal ion is very strong, so there will not be disengagement of metal ions. Thus, the disadvantages caused by metal bridging between free metal ion and resin that undermines the toner characteristics will not present, and the fixation characteristics will not be diminished. In addition, the dispersion characteristics of the invention is excellent; it is easy to disperse in resin.

In addition, if the polymerization reaction method is used as the method for preparing the charge control agent, the attraction between the charge control agent and the metal ion is very strong, as described above, and this prevents the charge control agent from being dissolving or otherwise decomposing during dispersion in the aqueous medium. Further, for the existence of metal coordination binding and ion binding, the dispersability of the charge control agent in aqueous medium is good, and it is easy to form micro particles of the charge control agent. In addition, its dispersability in monomer and solvent is good.

The following are the records of toner preparation methods.

1) Melting-Kneading-Pulverization Method

In the pulverization method, first, the powder of resin, colorant and the charge control agent of the present invention and optional release agent are dry-mixed (premix). Then, equipment, such as a twin roller extruder, is used to melt and knead the components, and the resulting mixture is cooled, pulverized, and classified to obtain the resultant toner. Pulverization can be either mechanical grinding or jet milling.

2) Emulsion Aggregation and Mini-Emulsion Aggregation Method

Emulsion aggregation method refers to a preparation method in which resin particles, colorant particles, and charge control agent particles of the present invention are aggregated and fused to form toner particles. In this method, an optional release agent may also be used. In this method, the preferred average size of resin particles, colorant particles, and charge control agent particles of the present invention is between 50-200 nm. In a preferred method, the monomer particles are directly aggregated in an aqueous medium by emulsion aggregation reaction or mini-emulsion aggregation reaction to form toner particles. In such method, uniform particle sizes can be obtained. The colorant particles can be achieved by using a mechanical homogenizer with the presence of surfactant in water. The homogenizer used can be CLEARMIX or bead miller. The charge control agent of the present invention can be dispersed using the same mechanical homogenizer as was used for the colorant.

3) Suspension Polymerization Method

First, the monomer, colorant, the charge control agent of the present invention, a polymerization initiator and the optional release agent are mixed. Second, a mixer is used to disperse the colorant, the charge control agent of the present invention, and the optional release agent in a monomer. Third, the mixture is dispersed in an aqueous medium with disperse stabilizer and oil drops are formed. Fourth, the polymerization reaction of the monomer is initiated. Fifth, the dispersed stabilizer in the polymerized monomer is removed, and the resultant substance is filtered and dried to produce the toner. In this method, the disperse stabilizer is easy to remove; the preferred examples include the use of an almost insoluble inorganic colloid, such as calcium phosphate.

4) Polyester (Elongation) Polymerization Method

The denatured polyisocyanate, multivalent amine used as molecular elongation agent, colorant, the charge control agent of the present invention, and an optional release agent are added to a solvent and mixed. The liquid is dispersed in an aqueous medium to form oil drops, and the mixture is heated to expansion the molecules. Then, the solvent is removed, the shape of the particle is controlled, and the resultant substance is filtered and dried to produce toner.

The above-mentioned toner of the present invention can be used as magnetic or non-magnetic mono-component developer, or it can be mixed with carrier to use as a dual-component developer.

In the cases in which such toner is used as magnetic monochrome developer, the suitable black colorants are magnetite, preferably with an average particle size in the range of 80-200 nm. The crystal shape of magnetite can be cubic, spherical, and octahedral. If reddish toner is desired, spherical shape magnetite is preferred. If the bluish toner is desired, cubic shape magnetite is preferred. The amount of coloring agent used as magnetic mono-component developer in the toner varies with the various developing methods. In the non-contact developing method, the preferred amount of coloring agent is 35-45% of the total weight of the toner. If the amount used is too small, dusting may occur. On the other hand, over usage of coloring agent may result in inferior developing properties.

On occasions in which dual-component developer is used, the carrier in such dual-component toner can be selected from iron, ferrite, magnetite, or an alloy of these metals with publicly-known metals, such as aluminum or lead. Ferrite is a preferred choice. It is preferred that the alloy not contain copper and zinc, but it may contain light alkali metals or light alkaline earth metals alloyed with ferrite. In addition, if these metals are used as the core of carrier, it is preferred to coat the core with silica resin, styrene acrylic resin, acrylic resin, or resin containing florin. The preferred average size of the carrier particles is 30-100 μm.

The above-mentioned toner of the present invention contains charge control agent, which provides excellent charge control properties. Thus, in different temperature and humidity conditions, whether temperature and humidity values are high or low, high-quality image can be ensured. In addition, due to the excellent charge ability, there is no possibility of dusting and fogging caused by unevenly-charged toner particles. Thus, high-quality image can be obtained.

In such toner, the ion coupling strength in the catechin gallate metal complexes, which is used as the charge control agent, is very strong and prevents the detachment of the metal ions that form the metal complexes. So, the problems caused by the free metal ion as an impurity, such as the bridging between metal ions and the resin that destroys the desired toner properties or large variations of image quality under different environments, can be minimized. Thus, excellent image quality can provided by the toner of the present invention, even in low-temperature fusing.

BRIEF DESCRIPTION OF THE DRAWINGS

Tables 1-8 show physical characteristics of toners in accordance with various embodiments of the invention.

DETAILED DESCRIPTION OF THE INVENTION

The following are embodiments of the invention, but they should not form a limit to the invention.

Embodiment 1 for Preparing Charge Control Agent

The 187 g of catechin gallate in the above formula (3), in which $R^1$ is a hydroxyl group, and $R^2$-$R^4$ are hydrogen atoms (referred to as [raw material compound (1) hereafter]), are placed in carbinol to obtain a solution with a concentration of 2 mol/L. Dissolve 23 g of zinc chloride in water to get a 3 mol/L solution, and adjust the pH of the solution to 10.0 by adding an ethanol solution that contains 4 mol/L of ethanol sodium. The raw material (1) solution is slowly added into the former solution, and the solution is maintained at 90° C. for 24 hours with mixing sufficiently, and the resultant crystalline product is filtered. Then, the resultant material is washed, dried, and crushed to obtain the powder metal complexes (hereafter referred to as [charge control agent (1)])173 g.

The resultant charge control agent (1) in Chemical Formula (1) is a catechin gallate metal complexes in which $R^1$ is a hydroxyl group, $R^2$-$R^4$ are hydrogen atoms, M is a zinc atom, A is a sodium atom, and m is 1. (Example compound (1-1))

Embodiment 2 for Preparing Charge Control Agent

The 91 g catechin gallate of above formula (3), in which $R^1$-$R^4$ are hydrogen atoms (refer to as [raw material compound (2) hereafter]), is put into ethanol containing 1% ethanol sodium to obtain the 150 ml material (2) solution. Then, 23 g of zinc chloride are dissolved in ethanol to get a 5 mol/L solution, and the raw material (2) solution is slowly added to the former solution, and the solution is maintained at 50° C. for 30 hours with mixing sufficiently, and the resultant crystalline product is filtered. Then, the resultant material is washed, dried, and crushed to obtain the powder metal complexes (hereafter referred to as [charge control agent (2)])170 g.

The resultant charge control agent (2) in Chemical Formula (1) is a catechin gallate metal complexes in which $R^1$-$R^4$ are hydrogen atoms, M is a zinc atom, A is a sodium atom, and m is 1. (Example compound (1-2))

Embodiment 3 for Preparing Charge Control Agent

The 200 g material compound (1) is put into 1.5 L of water to get raw material compound (1) solution. Then, 37 g of chrome vitriol is dissolved in 200 ml of water, and a 6 mol/L solution of hartshorn is slowly added to adjust the pH to 8.0, the above raw material compound (1) solution is added, the solution is maintained at 80° C. for 24 hours with mixing sufficiently, and the resultant crystalline substance is filtered. Then, the resultant material is washed, dried, and crushed to obtain the powder metal complexes (hereafter referred to as [charge control agent (3)])173 g.

The resultant charge control agent (3) in Chemical Formula (1) is a catechin gallate metal complexes in which $R^1$ is an hydroxyl group, $R^2$-$R^4$ are hydrogen atoms, M is a chromium atom, A is $NH_4^+$, and m is 1. (Example compound (1-3))

Embodiment 4 for Preparing Charge Control Agent

The 250 g of raw material compound (1) are put into ethanol to get 1 mol/L raw material compound (1) solution. Then, 30 g of iron vitriol are dissolved in 40 ml of water, and 5 mol/L sodium hydroxide solution is slowly added to adjust the pH to 8.5, the above raw material compound (1) solution is added to adjust the pH of the mixed solution to 8.5, the solution is maintained at 70° C. for 15 hours with mixing sufficiently, and the resultant crystalline substance is filtered. Then, the resultant material is washed, dried, and crushed to obtain the powder metal complexes (hereafter referred to as [charge control agent (4)])228 g.

The resultant charge control agent (4) in Chemical Formula (1) is a catechin gallate metal complexes in which $R^1$ is an hydroxyl group, $R^2$-$R^4$ are hydrogen atoms, M is a iron atom, A is a sodium atom, and m is 1. (Example compound (1-4))

Embodiment 5 for Preparing Charge Control Agent

The 200 g of raw material compound (2) is put into 1.5 L of water to get material compound (2) solution. Then, 37 g of chrome vitriol is dissolved in 200 ml of water, the 6 mol/L hartshorn is slowly added to adjust the pH to 8.5, the above raw material compound (2) is added, the solution is maintained at 80° C. for 24 hours with mixing sufficiently, and the resultant crystalline substance is filtered. Then, the resultant material is washed, dried, and crushed to obtain the powder metal complexes (hereafter referred to as [charge control agent (5)])170 g.

The resultant charge control agent (5) in Chemical Formula (1) is a catechin gallate metal complexes in which $R^1$-$R^4$ are hydrogen atoms, M is a chromium atom, A is an ammonium ion, and m is 1. (Example compound (1-5))

Embodiment 6 for Preparing Charge Control Agent

The 200 g of material compound (1) is put into 1.5 L of water to get raw material compound (1) solution. The, 40 g of cobalt chloride is dissolved in 200 ml of water, caustic soda is slowly added to adjust the pH to 9.5, the above raw material compound (1) is added, the solution is maintained at 80° C. for 24 hours with mixing sufficiently, and the resultant crystalline substance is filtered. Then, the resultant material is washed, dried, and crushed to obtain the powder metal complexes (hereafter referred to as [charge control agent (6)])170 g.

The resultant charge control agent (6) in Chemical Formula (2) is a catechin gallate metal complexes in which $R^1$ is an hydroxyl group, $R^2$-$R^4$ are hydrogen atoms, $R^5$ and $R^6$ are water molecule, M is a cobalt atom, A is a sodium atom, and m is 1. (Example compound (2-1))

Embodiment 7 for Preparing Charge Control Agent

The 200 g raw material compound (2) is put into 1.5 L of water to get raw material compound (2) solution. Then, 40 g of cobalt chloride is dissolved in 200 ml of water, caustic soda is slowly added to adjust the pH to 9.5, the above raw material compound (2) is added, the solution is maintained at 80° C. for 24 hours with mixing sufficiently, and the resultant crystalline substance is filtered. Then, the resultant material is washed, dried, and crushed to obtain the powder metal complexes (hereafter referred to as [charge control agent (7)])170 g.

The resultant charge control agent (7) in Chemical Formula (2) is a catechin gallate metal complexes in which $R^1$-$R^4$ are hydrogen atoms, $R^5$ and $R^6$ are water molecule, M is a cobalt atom, A is a sodium atom, and m is 1. (Example compound (2-2))

Embodiment 8 for Preparing Charge Control Agent

The 191 g compound of formula (3) (referred to as [material compound (3) hereafter]) in which $R^1$ is a hydroxyl group, $R^2$ and $R^3$ are methyl ions, and $R^4$ is a hydrogen atom, are put into carbinol to obtain a 2 mol/L raw material (3) solution. Then, 23 g of zinc chloride are dissolved in water to get a 3 mol/L solution, and the pH value is adjusted to 10.0 by adding ethanol solution that contains 4 mol/L of ethanol sodium. The raw material (3) solution is slowly added to the former solution, and the resulting solution is maintained at 90° C. for 24 hours with mixing sufficiently, and the resultant crystalline substance is filtered. Then, the resultant material is washed, dried, and crushed to obtain the powder metal complexes (hereafter referred to as [charge control agent (8)])173 g.

The resultant charge control agent (8) in chemical formula (1) is a catechin gallate metal complexes in which $R^1$ is a hydroxyl group, $R^2$ and $R^3$ are methyl groups, $R^4$ is an hydrogen atom, M is a zinc atom, A is a sodium atom, and m is 1. (Example compound (1-6))

Embodiment 9 for Preparing Charge Control Agent

The 200 g compound of formula (3), in which $R^1$ is a hydroxyl group, $R^2$ and $R^3$ are chlorine atoms, and $R^4$ is an hydrogen atom, (refer to as [raw material compound (4) hereafter]), are put into carbinol to obtain a 2 mol/L raw material (4) solution. Then, 23 g of zinc chloride are dissolved in water to get a 3 mol/L solution, and the pH value is adjusted to 10.0 by adding ethanol solution containing 4 mol/L of ethanol sodium. The raw material (4) solution is slowly added into the former solution, and the resulting solution is maintained at 90 for 24 hours with mixing sufficiently, and the resultant crystalline substance is filtered. Then, the resultant material is washed, dried, and crushed to obtain the powder metal complexes (hereafter referred to as [charge control agent (9)])173 g.

The resultant charge control agent (9) in chemical formula (1) is a catechin gallate metal complexes in which $R^1$ is a hydroxyl group, $R^2$ and $R^3$ are chlorine atoms, $R^4$ is an hydrogen atom, M is a zinc atom, A is a sodium atom, and m is 1. (Example compound (1-13))

The charge control agent obtained from the preparation embodiment 1 to preparation embodiment 9 are used to make toner according to the following methods, and the obtained toner is used to produce developer.

Embodiment 1 for Preparing Toner with Pulverization Method

One part of charge control agent (1), 100 parts of styrene-acrylic resin (styrene:butyl acrylate:methyl methacrylate=70:20:5 (by weight), softening point is 128° C.), 8 parts of carbon black 'MOGUL L' (manufactured by Cabot Co.) and 6 parts of low-molecular weight polypropylene '660P' (manufactured by Sanyo Chemical) are mixed in a Henschel mixer. The resultant mixture is melted and kneaded with a twin-screw extruder, cooled, pulverized with a jet mill, and classified with a cyclone classifier to obtain colored particles with an average diameter of approximately 8.5 μm.

Then 0.8 part of 67% hydrophobic silica dioxide with an average diameter of 12 nm is added into every 100 parts of the colored particles. The resultant mixture is mixed with a Henschel mixer to obtain the toner.

Embodiments 2-9 for preparing toner with pulverization method and comparative embodiments 1-3 for preparing toners with pulverization method In the embodiments 1 for preparing toner with pulverization method, the charge control agent listed in Table 1 are used to replace the charge control agent (1), and other conditions are the same as the conditions used for the embodiments 1 for preparation of toner with pulverization method, to obtain toner.

Hereafter, the toners using the charge control agent (1) to charge control agent (9) listed in the Table 1 are named as toner (1)-toner (9). In addition, chromium salicylate complexes [E-81] (manufactured by Orient Chemical Co.), calixarene derivative [E-88] (manufactured by Orient Chemical Co.), and chromium azo complexes [S-34] (manufactured by Orient Chemical Co.) as comparative charge control agent, are used to obtain comparative toner, as shown in Table 1, which are named as comparative toner (1)-comparative toner (3).

Embodiment 1 for Preparing Toner with Suspension Polymerization Method

One part of charge control agent, 75 parts of styrene monomer, 25 parts of butylacrylate, 5 parts of MOGUL L, 3 parts of copper phthalocyanine pigment (C.I. P.B. 15:3) and 2 parts of Azobis (isovaleronitrile) are mixed. The resultant mixture is dispersed in a sand mill at 10,000 rpm for 30 minutes to obtain a mixture of polymerizable monomer.

Then, 600 parts of ion exchanged water and 500 parts of a 0.1 mol/L solution of $Na_3PO_4$ in water are placed in a 4-neck, 2 L flask equipped with a high-speed mixing device (TK homogenizer manufactured by PRIMIX Corporation) and a baffle plate. The solution is mixed at 12,000 rpm at 65° C.

Then, 70 parts of a 1.0 mol/L solution of $CaCl_2$ in water are slowly added to prepare an aqueous dispersion medium containing weenies dispersion stabilizer $Ca_3(PO_4)_2$ which is hardly soluble in water.

Then, the polymerizable monomer mixture is added to the aqueous dispersion medium, stirring is continued at 12,000 rpm for 15 minutes in a nitrogen gas environment at 65° C. to form particles of the polymerizable monomer composite. The stirring blade is exchanged for a spiral stirring blade, and the shape of the particles is controlled by the stirring speed and the angle of the baffle plate. The temperature is maintained for 10 hours to complete the polymerization. After the completion of the polymerization, the suspension liquid is cooled, and dilute hydrochloric acid is added to remove dispersion stabilizer. The resultant mixture is washed with water for times, and dried to obtain colored particles with a volume average diameter of 8.2 μm.

Then 0.8 part of 67% hydrophobic silica dioxide with a number average diameter of 12 nm is added into 100 parts of the colored particles. The resultant mixture is mixed with a Henschel mixer to obtain the toner.

Embodiments 2-9 for Preparing Toner with Suspension Polymerization Method and Comparative Embodiments 1-3 for Preparing Toners with Pulverization Method In embodiment 1 for preparing toner with suspension polymerization method, the charge control agent listed in Table 3 are used to replace the charge control agent (1). The other conditions are the same as the conditions used in the embodiment 1 for preparing toner with suspension polymerization method, to obtain toner.

Hereafter, the toner with suspension polymerization method using the charge control agent (1) to charge control agent (9) listed in the Table 3 are named as toner (10)-toner (18). In addition, chromium salicylate complexes [E-81] (manufactured by Orient Chemical Co.), calixarene derivative [E-88] (manufactured by Orient Chemical Co.), and chromium azo complexes [S-34] (manufactured by Orient Chemical Co.) as comparative charge control agent are used to obtain comparative suspension polymerized toner, as shown in Table 3, which are named comparative toner (4)-comparative toner (6).

Embodiment 1 for Preparing Toner with Emulsion Aggregation Method

1) Preparing the Dispersion Liquid of Resin Particles

A solution of 16 parts of sodium dodecylsulfate is added into 1500 parts of ion exchanged water in a reactor with a stirring device, temperature sensor, cooling tube and nitrogen injector. The solution is stirred under nitrogen gas current at 230 rpm and heated to 80 Then, a solution of 5 parts of potassium persulfate in 100 parts of ion exchanged water is added to the system, and the system is heated again to 80° C. In one hour, a polymerizable monomer liquid that contains 350 parts of styrene, 125 parts of n-butylacrylate, 25 parts of methacrylic acid, and 4 parts of n-dodecyl mercaptan is dropped into the reactor. The resultant solution is heated to 80° C. for 2 hours and mixed to allow polymerization to prepare resin particle dispersion liquid (1).

The electrophoresis light scattering photometer (ELS-800) (Manufactured by Osuka Electronics Co., Ltd.) is used to determine the particle size in the resin particle dispersion liquid (1), the volume average diameter of which is 110 nm.

2) Preparing Carbon Black Dispersion Liquid

Ten parts of sodium dodecylsulfate are dissolved in 160 parts of ion exchanged water. Forty parts of carbon black 'MOGUL L' (manufactured by CABOT, Co.) are slowly added to the solution and dispersed with 'CLEARMIX' (manufactured by M Technique Co.) to prepare colorant dispersion liquid (1).

The electrophoresis light scattering photometer (ELS-800) (Manufactured by Osuka Electronics Co., Ltd.) is used to determine the particle size in the colorant dispersion liquid (1), the volume average diameter of which is 120 nm.

3) Preparing Charge Control Agent Dispersion Liquid

Five parts of sodium dodecylsulfate are dissolved in 200 parts of ion exchanged water. Five parts of charge control agent (1) are slowly added into the solution. The resultant product is dispersed with a sand mill to prepare a charge control agent dispersion liquid (1).

The electrophoresis light scattering photometer (ELS-800) (Manufactured by Osuka Electronics Co., Ltd.) is used to determine the particle size in the colorant dispersion liquid (1), the volume average diameter of which is 110 nm.

4) Preparing Release Agent Dispersion Liquid

The solution of 6 parts of sodium sulfate in 200 parts of ion exchanged water is heated to 90 while stirring, 40 parts of melted carnauba wax at 90 are slowly added, sonication is used to disperse the particles, and a wax dispersion liquid (1) is formed.

The electrophoresis light scattering photometer (ELS-800) (Manufactured by Osuka Electronics Co., Ltd.) is used to determine the particle size in the colorant dispersion liquid (1), the volume average diameter of which is 130 nm.

5) Aggregating (Fusing) with Resin Particle

The above mentioned resin particle dispersion liquid (1), colorant dispersion liquid (1), charge control agent dispersion liquid (1), release agent (1), disperse agent (1) and 1400 parts of ion exchanged water are placed in a reactor that has a stirring device, temperature sensor, cooling tube, and nitrogen injector, and a solution of 10 parts of polyoxyethylene-2-sodium dodecylsulfate ether in 500 parts of ion exchanged water is added to this mixture. The temperature of the system is adjusted to 30, and the pH value is adjusted to 10 with a 5 N solution of sodium hydroxide in water.

Then 100 parts of magnesium chloride is dissolved in 100 parts of ion exchanged water and added to the mixture at 30 over a 10-minute period with continuous stirring. After the addition is completed, stirring is continued for an additional three minutes, and the system is gradually heated to 90 over a 60-minute time period. The temperature is maintained at 90 to let the particles aggregate. The 'Coulter Multilizer III' is used to determine the size of the aggregated particles. When the desired particle size is obtained, a solution of 300 parts of sodium chloride in 1000 parts of ion exchanged water is added to stop particle growth. The mixture is heated to 98 to let the particles fuse until the average roundness of the particles is 0.965 as determined by testing with 'FPIA-2100.' The liquid is cooled to 30, the pH value is adjusted to 4.0 with hydrochloric acid, and stirring is stopped to obtain toner.

Embodiments 2-9 for Preparing Toners with Emulsion Aggregation Method and Comparative Embodiments 1-3 for Preparing Toners with Emulsion Aggregation Method In the embodiment 1 for preparing toner with emulsion aggregation method, the charge control agent listed in Table 5 are used to replace the charge control agent (1), and other conditions are the same as the conditions used in the embodiment 1 for preparing toner with emulsion aggregation method, to obtain toner.

Hereafter, the toner with emulsion aggregation method using the charge control agent (1) to charge control agent (9) listed in the Table 1 are named as toner (19)-toner (27). In addition, chromium salicylate complexes [E-81] (manufactured by Orient Chemical Co.), calixarene derivative [E-88] (manufactured by Orient Chemical Co.), and chromium azo complexes [S-34] (manufactured by Orient Chemical Co.) are used as comparative charge control agent to obtain comparative emulsion aggregated toner, as shown in Table 5, which are named comparative toner (7)-comparative toner (9).

Embodiment 1 for Preparing Toner with Polyester (Elongation) Polymerization Method Preparation of Denatured Polyisocyanate Place 724 parts of bisphAlkenyl A ethylene oxide and 2 mol additive, 200 parts of isophthalic acid, 70 parts of fumaric acid, and 2 parts of dibutylin oxide in a reactor that has a mixer and a nitrogen injection device. The resulting mixture is reacts at a temperature of 230 and atmospheric pressure for 8 hours and reacts at a pressure of 12 mm Hg for 5 hours. The system is cooled to 160, 32 parts of phthalic anhydride are added, and the solution is reacted for 2 hours to obtain unformed polyester [a1].

The unformed polyester [a1] has a glass transition point of 59 and a softening point of 121, a number average molecular weight (Mn) of 6,000, and a weight average molecular weight (Mw) of 28,000.

Then 1,000 parts of the unformed polyester [a1] are added for every 2,000 parts of ethyl acetate, and 120 parts of isophorone diisocyanate are added. The resultant solution is reacted at 80 for 2 hours to obtain denatured polyisocyanate [1].

Place 450 parts of ethyl acetate, 300 parts of denatured polyisocyanate [1], 14 parts of isophoronediamine, 4 parts of copper phthalocyanine blue, 4 parts of carbon black, 15 parts of carnauba wax, and 3 parts of charge control agent (1) in a reactor that has a hydraulic seal and a stirrer and react the mixed solution at 20° C. for 2 hours to obtain toner composite [1].

At the same time, 600 parts of ion exchanged water, 60 parts of methyl ethyl ketone, 60 parts of tricalcium phosphate, and 0.3 part of sodium dodecyl benzene sulfonate are put into another reactor. The mixed solution is stirred with a TK homogenizer (manufactured by PRIMIX Corporation) at 15,000 rpm at a temperature of 30 for 3 minutes. Then, the above mentioned toner composite [1] is added to the mixture to disperse in a aqueous medium, heated to 80, and treated with urea for 10 hours to obtain particles with a volume average diameter of 5.5 μm.

The urea-treated toner composite [1] is moved to another mixer, 0.3 part of sodium dodecylsulfate is added at 30, heated to 50, and react for 3 hours to let the particle surface coalescent with the dodecyl group. Then, the resultant solution is rapidly heated to 80 to remove ethyl acetate. After the ethyl acetate has been completely removed, the system is cooled to room temperature; 150 parts of 35% hydrochloric acid are added to remove the tricalcium phosphate on the surface of the toner particles.

The liquid and the solid are separated, and the dehydrated toner press cake is dispersed in ion exchange water. This separation process is repeated 3 times, and the product is washed and then dried at 40 for 24 hours to obtain toner particle [Bk1].

Embodiments 2-9 for Preparing Toners with Polyester (Elongation) Polymerization Method and Comparative Embodiments 1-3 for Preparing Toners with Polyester (Elongation) Polymerization Method In the embodiment 1 for preparing toner with Polyester (Elongation) Polymerization method, the charge control agent listed in Table 7 are used to replace the charge control agent (1), and other conditions are the same as the conditions used in the embodiment 1 for preparing toner with Polyester (Elongation) Polymerization method.

Hereafter, the polyester expansion polymerized toners using the charge control agent (1) to charge control agent (9) listed in the Table 7 are named as toner (28)-toner (36). In addition, the comparative polyester expansion polymerized toners of chromium salicylate complexes [E-81] (manufactured by Orient Chemical Co.), calixarene derivative [E-88] (manufactured by Orient Chemical Co.), and chromium azo complexes [S-34] (manufactured by Orient Chemical Co.), which are used as the comparative charge control agent, are shown in Table 7, which are named as comparative toner (10)-comparative toner (12).

Embodiments 1-36 and Comparative Embodiments 1-12

The toners and the carrier comprised of light metal ferrite coated with silicone with volume average size of 65 μm are mixed to obtain duel-component developers containing 8% toner.

Then the dual-component developers using toner (1)-toner (36) are named as developer (1)-developer (36). And the dual-component developers using comparative toner (1)-comparative toner (12) are named as comparative developer (1)-comparative developer (12).

The following methods are used to evaluate the developer (1)-developer (36) and the comparative developer (1)-comparative developer (12). The results are shown in the following Tables 1-8.

(1) Charge Characteristics

One gram of each kind of toners, which are used to produce developer (1)-developer (36) and comparative developer (1)-comparative developer (12), are separately put into a 20-ml, glass test tube with 10 g of carrier. At conditions of 20 and 50% RH, the resultant substance is stirred with a YAYOI shaker for 1 minute, 2 minutes, 5 minutes, 10 minutes, 20 minutes, and 60 minutes. Under room temperature and normal humidity, the resultant substance is tested with a TB-200 charge-amount testing apparatus (manufactured by Toshiba, Co.) to determine the charge amounts.

(2) Charge Stability

One gram of each kind of toners, which are used to produce developer (1)-developer (36) and comparative developer (1)-comparative developer (12) are separately put into a 20-ml, glass test tube with 10 g of carrier. Under room temperature and normal humidity, the resultant substance is tested with a TB-200 charge amount-testing apparatus (manufactured by Toshiba, Co.) to determine the charge amounts (shown in Table 1 as initial charge amount). Then, the resultant substance is stored at 35 and 85% RH for 24 hours, the charge amount is tested again (shown as charge amount after storage in tables).

(3) Image Quality

The respective developers, developer (1)-developer (36) and comparative developer (1)-comparative developer (12), are used by the contacting image method to produce image of A4 size and pixel rate of 5% in a photocopier (Ricoh Imagio Neo 1050Pro) that has a maximum speed of 105 pages per minute at 20 and 50% RH environment, as well as at 35 and 85% RH. The image copying mode is that image formation pauses for 1 minute after every 50 pages using A4 photocopy paper for a total 500,000 pages. The image density of the black image of the initial image (shown as 'initial'), the $500{,}000^{th}$ image (shown as $500{,}000^{th}$), and the fog density of the blank space in these pages are tested with 'RD-918' of Macbeth Company. The tests are conducted regarding the reflecting rate of the copying paper as '0' to determine the relative reflect rate of the image.

In addition, the character resolution of the initial image and the $500{,}000^{th}$ image is observed with a 10× magnifier. While observed visually, the toner charge amount of the initial image and the $500{,}000^{th}$ image are tested.

While particular embodiments of the invention have been shown and described, to those skilled in the art it will be obvious that changes and modifications may be made without departing from the invention in its broader aspects, and, therefore, the aim in the appended claims is to cover all such changes and modifications as fall within the true spirit and scope of the invention.

What is claimed is:

1. A charge control agent comprising:

a specific type of metal complexes represented by the following chemical formula (1) or chemical formula (2):

(1)

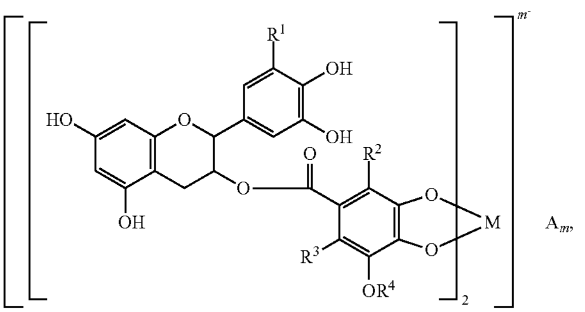

in formula (1), $R^1$ represents an hydroxyl group or an hydrogen atom; $R^2$ and $R^3$ independently represent a substituted or unsubstituted alkyl group with 1-12 carbon atoms, an alkenyl with 2-12 carbon atoms, an alkoxy group with 1-12 carbon atoms, a substituted or unsubstituted aryl group with 6-12 carbon atoms, a nitryl group, an amidogen group, an halogen atom, or an hydrogen atom; $R^4$ represents an hydrogen atom, a potassium atom, or a sodium atom; M represents a metal atom ranges from divalent to tetravalent, A is a cation, and m is an integer from 1 to 6;

(2)

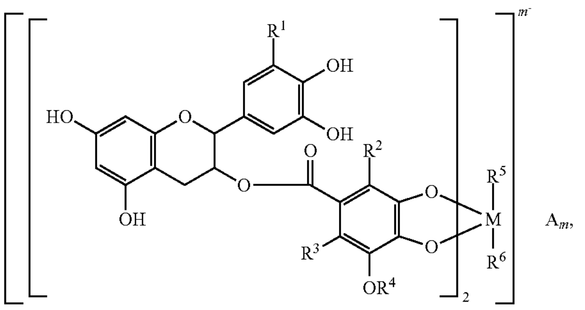

in formula (2), $R^1$ represents an hydroxyl group or an hydrogen atom; $R^2$ and $R^3$ independently represent substituted or unsubstituted alkyls with 1-12 carbon atoms, an alkenyl with 2-12 carbon atoms, an alkoxy group with 1-12 carbon atoms, a substituted or unsubstituted aryl group with 6-12 carbon atoms, a nitryl group, an amidogen group, an halogen atom, or an hydrogen atom; $R^4$ represents an hydrogen atom, a potassium atom or a sodium atom; $R^5$ and $R^6$ independently represent a hydroxyl group, a water molecule, or a halogen atom; M represents a metal atom ranges from divalent to tetravalent, A is a cation, and m is an integer from 1 to 6.

2. A toner comprising a resin, a colorant, and the charge control agent of claim 1.

* * * * *